(12) United States Patent
Tsukui

(10) Patent No.: US 10,177,402 B2
(45) Date of Patent: Jan. 8, 2019

(54) METHOD OF MANUFACTURING SEALED BATTERY

(71) Applicant: TOYOTA JIDOSHA KABUSHIKI KAISHA, Toyota-shi, Aichi (JP)

(72) Inventor: Akira Tsukui, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 117 days.

(21) Appl. No.: 14/784,765

(22) PCT Filed: Feb. 6, 2014

(86) PCT No.: PCT/JP2014/052735
§ 371 (c)(1),
(2) Date: Oct. 15, 2015

(87) PCT Pub. No.: WO2014/171169
PCT Pub. Date: Oct. 23, 2014

(65) Prior Publication Data
US 2016/0087304 A1    Mar. 24, 2016

(30) Foreign Application Priority Data

Apr. 19, 2013  (JP) .................................. 2013-088279

(51) Int. Cl.
*H01M 10/04* (2006.01)
*H01M 2/36* (2006.01)

(52) U.S. Cl.
CPC ......... *H01M 10/049* (2013.01); *H01M 2/361* (2013.01); *H01M 2/365* (2013.01); *H01M 10/04* (2013.01)

(58) Field of Classification Search
CPC ........................... H01M 10/04; H01M 10/049
See application file for complete search history.

(56) References Cited

U.S. PATENT DOCUMENTS

| 2015/0155603 A1 | 6/2015 | Tsukui |
| 2015/0255832 A1 | 9/2015 | Tsukui et al. |

FOREIGN PATENT DOCUMENTS

| JP | 2000-353547 A | 12/2000 | |
| JP | 2000353547 A | * 12/2000 | ............ H01M 10/40 |
| JP | 2002-117901 A | 4/2002 | |
| JP | 2003-031206 A | 1/2003 | |

(Continued)

*Primary Examiner* — Karie O'Neill Apicella
(74) *Attorney, Agent, or Firm* — Hunton Andrews Kurth LLP

(57) ABSTRACT

Provided is a method of manufacturing a sealed battery, capable of releasing a gas generated during an initial charge without increasing the number of steps. The method of manufacturing the sealed battery including a battery case having an opening, and a power-generating element stored in the battery case, includes: a step of storing an electrode body in the battery case; a step of pouring an electrolyte solution into the battery case through the opening to turn the electrode body into the power-generating element; a step of temporarily sealing the opening with a temporary sealing member; a step of performing the initial charge of the power-generating element; a step of introducing a detection gas into the battery case through the opening while opening the temporarily sealed opening; and a step of finally sealing the opening with a final sealing member.

2 Claims, 10 Drawing Sheets

(56) References Cited

FOREIGN PATENT DOCUMENTS

| | | | | |
|---|---|---|---|---|
| JP | 2006202560 A | * | 8/2006 | ............ H01M 10/04 |
| WO | 2014/003175 A1 | | 1/2014 | |
| WO | 2014/024848 A1 | | 2/2014 | |

* cited by examiner

METHOD OF MANUFACTURING SEALED BATTERY

CROSS-REFERENCE TO RELATED APPLICATIONS

This is a national phase application based on the PCT International Patent Application No. PCT/JP2014/052735 filed Feb. 6, 2014, claiming priority to Japanese Patent Application No. 2013-088279 filed Apr. 19, 2013, the entire contents of both of which are incorporated herein by reference.

TECHNICAL FIELD

The present invention relates to a method of manufacturing a sealed battery, the method including introducing a detection gas into a battery case through an opening after pouring an electrolyte solution into the battery case through the opening, and then sealing the opening.

BACKGROUND ART

Conventionally, a step of manufacturing a sealed battery includes an inspection of sealability of a battery case for the purpose of, for example, prevention of degradation of battery performance caused by infiltration of moisture into the battery case.

In the step of manufacturing the sealed battery, a detection gas (e.g., a helium gas) is introduced into the battery case to check whether the detection gas leaks from the battery case or not.

For example, JP 2002-117901 A discloses a technique for introducing the detection gas.

According to JP 2002-117901 A, a pouring nozzle connected to a helium-supplying means through an electrolyte pot is inserted into a pouring hole, and thereafter a helium gas is discharged from the outside to the inside of a battery can (a battery case) to introduce the helium gas into the battery can.

In the step of manufacturing the sealed battery, a gas such as hydrocarbon is generated by, for example, decomposition of an electrolyte solution during an initial charge of the battery. In the step of manufacturing the sealed battery, if the gas is generated during the initial charge in such a large amount that pressure-resistance requirement of the battery can is not satisfied, the gas accumulating in the battery can needs to be released.

In this case, in the step of manufacturing the sealed battery, the initial charge is performed after temporarily sealing the pouring hole, and then the temporary seal of the pouring hole is removed to release the gas generated during the initial charge. Thereafter, a helium gas is introduced, and the pouring hole is finally sealed.

The technique disclosed in JP 2002-117901 A includes introducing the helium gas into the open battery can from the outside. In other words, the technique disclosed in JP 2002-117901 A presupposes that the pouring hole is not temporarily sealed or that the temporary seal is previously removed before introducing the helium gas.

For this reason, if the gas generated during the initial charge is released and the helium gas is introduced using the technique disclosed in JP 2002-117901 A, a step of temporarily sealing the pouring hole, a step of performing the initial charge, a step of removing the temporary seal and a step of introducing the helium gas need to be performed in this order.

As mentioned above, it is impossible to efficiently perform the step of manufacturing the sealed battery by a conventional technique. As a result, many steps need to be performed to manufacture the sealed battery, which leads to a high cost required to manufacture the sealed battery by the conventional technique.

CITATION LIST

Patent Literature

PTL 1: JP 2002-117901 A

SUMMARY OF INVENTION

Technical Problem

The present invention has been made in view of the situation as mentioned above. The object of the present invention is to provide a method of manufacturing a sealed battery, capable of releasing a gas generated during an initial charge without increasing the number of steps.

Solution to Problem

A first aspect of the invention is a method of manufacturing a sealed battery including a battery case having an opening which connects the inside and the outside of the battery case, and a power-generating element stored in the battery case. The method includes: a step of storing an electrode body in the battery case, the electrode body having a positive electrode, a negative electrode and a separator; a step of pouring an electrolyte solution into the battery case through the opening to turn the electrode body into the power-generating element; a step of temporarily sealing the opening, with a temporary sealing member, of the battery case into which the electrolyte solution is poured; a step of performing an initial charge of the power-generating element inside the battery case in which the opening is temporarily sealed; a step of introducing a detection gas into the battery case through the opening while opening the opening temporarily sealed with the temporary sealing member; and a step of finally sealing the opening, with a final sealing member, of the battery case into which the detection gas is introduced.

Preferably, the step of introducing the detection gas includes: preparing a sealing nozzle configured to discharge the detection gas; and discharging the detection gas from the sealing nozzle while an end of the sealing nozzle near the opening pierces the temporary sealing member by moving the sealing nozzle toward the temporarily sealed opening.

Preferably, the end of the sealing nozzle near the opening is pointed toward the opening.

Advantageous Effects of Invention

The present invention makes it possible to release a gas generated during an initial charge without increasing the number of steps.

DESCRIPTION OF EMBODIMENTS

Described below is a step of manufacturing a battery 10 as an embodiment of a method of manufacturing a sealed battery according to the present invention.

First, the summary structure of the battery 10 is described.

The battery 10 is a sealed lithium-ion secondary battery. The present invention is applicable not only to the lithium-ion secondary battery but also to another sealed battery such as a nickel-hydrogen secondary battery.

Figure 1:
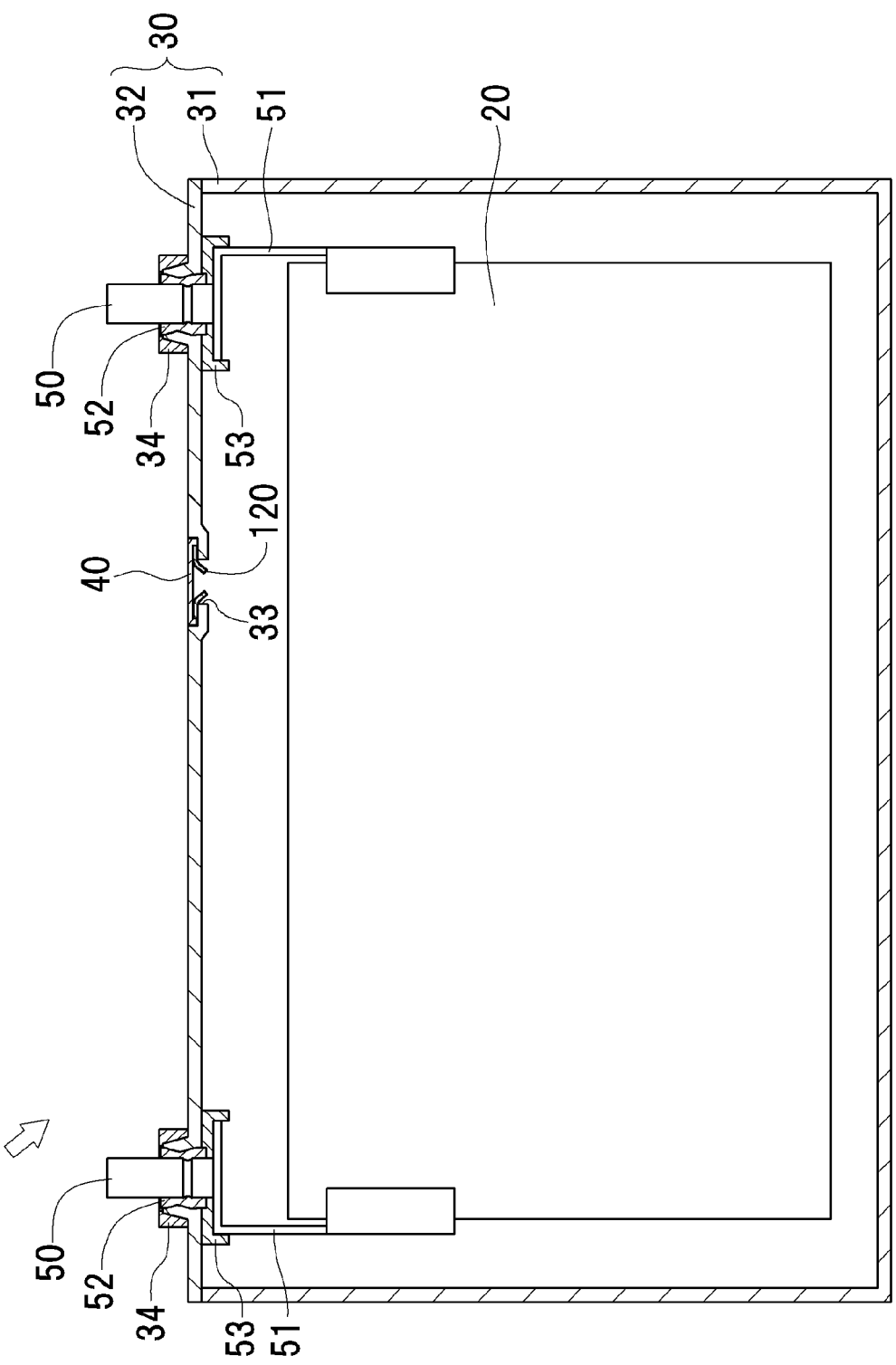
FIG. 1 shows the whole structure of a sealed battery.

As shown in FIG. 1, the battery 10 includes a power-generating element 20, an exterior 30, a cap 40, and two external terminals 50.

Figure 2:
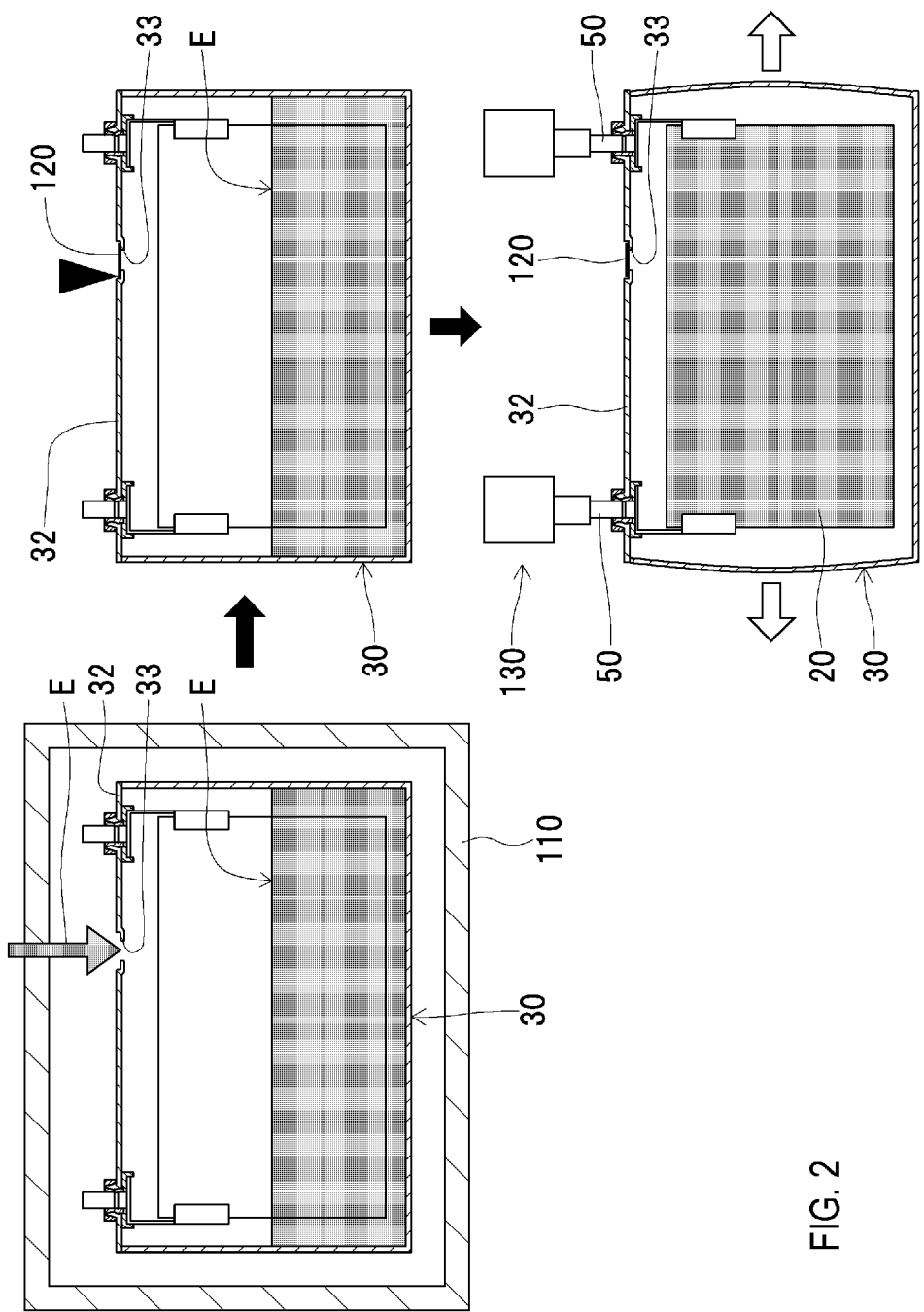
FIG. 2 shows steps from pouring of an electrolyte solution to an initial charge of the sealed battery.

The power-generating element 20 is made by impregnating an electrolyte solution E into an electrode body formed by laminating and winding a positive electrode, a negative electrode and a separator (see FIG. 2). A chemical reaction occurs inside the power-generating element 20 during electric charge and discharge of the battery 10 (specifically, ions move between the positive electrode and the negative electrode through the electrolyte solution E), and thereby an electric current flows.

The exterior 30 serving as the battery case is a can in the shape of substantially a rectangular parallelepiped, and has a storage part 31 and a lid part 32.

The storage part 31 is a member formed in a bottomed square tube having one open face, and contains the power-generating element 20.

The lid part 32 is formed in a flat plate coinciding in shape with the open surface of the storage part 31, and is joined to the storage part 31 in such a manner as to close the open surface of the storage part 31. In the lid part 32, as mentioned later, a pouring hole 33 through which the electrolyte solution E is poured is formed between the parts into which the external terminals 50 are inserted.

The pouring hole 33 is a hole bored from the one plate surface to the other of the lid part 32. The pouring hole 33 is formed in substantially a circle as viewed in a plan view, and the parts of the pouring hole 33 situated on the outside and the inside of the lid part 32 has different inner diameters. In the pouring hole 33, the upper part (the part situated on the upper side in FIG. 1) thereof has an inner diameter larger than that of the lower part (the part situated on the lower side in FIG. 1) thereof, and therefore a stepped part is formed in the middle part in the vertical direction.

On the stepped part, a film 120 is deposited in the step of manufacturing the battery 10, the film 120 being formed in substantially a circle as viewed in a plan view. The film 120 is pierced in the step of manufacturing the battery 10. For this reason, FIG. 1 showing the finished battery 10 illustrates the pierced film 120.

In the present embodiment, the battery is the prismatic battery having the exterior formed in the bottomed square tube. However, the battery is not limited thereto. For example, the battery may be a cylindrical battery having an exterior formed in a bottomed cylinder.

The cap 40 is a lid formed in substantially a circular plate, and seals the pouring hole 33. The cap 40 is formed so that the film 120 is covered with the lower surface of the cap 40 from the outside. The outer diameter of the cap 40 is substantially equal to the inner diameter of the upper part of the pouring hole 33.

The cap 40 is placed on the stepped part of the pouring hole 33. The cap 40 is joined to the lid part 32 by welding the outer peripheral part of the cap 40 with a laser beam.

The external terminals 50 are arranged so that parts thereof protrude upward (outward) relative to the battery 10 from the outside surface of the lid part 32. The external terminals 50 are electrically connected, through two current-collecting terminals 51, to the positive electrode and the negative electrode of the power-generating element 20, respectively. Each of the external terminals 50 is fixed to the lid part 32 through insulating members 52 and 53 in an insulating manner by fitting two fixing members 34 into the outer circumferential surfaces of the external terminals 50. The external terminals 50 and the current-collecting terminals 51 function as energizing paths for transmitting electric power stored in the power-generating element 20 to the outside or introducing electric power from the outside into the power-generating element 20.

The current-collecting terminals 51 are connected to the positive electrode and the negative electrode of the power-generating element 20, respectively. The current-collecting terminals 51 may be made of, for example, aluminum on a positive electrode side and copper on a negative electrode side.

The external terminals 50 have bolt parts formed by applying roll threading to the parts thereof protruding outward relative to the battery 10. During actual use of the battery 10, bus bars and members such as connecting terminals for an outside device are fastened to the external terminals 50 by use of the bolt parts.

When fastening these members, fastening torque is applied to the external terminals 50, and screw tightening applies external force in the axial direction thereto. Accordingly, it is preferable that the external terminals 50 are made of a high-strength material such as iron.

Next, the step of manufacturing the battery 10 is described.

In the step of manufacturing the battery 10, the surfaces of current collectors (a positive electrode current collector and a negative electrode current collector) are coated with mixtures (a positive electrode mixture and a negative electrode mixture) by a coating machine such as a die coater, and then the mixtures are dried.

Thereafter, the mixtures applied onto the surfaces of the current collectors are pressed, thereby forming mixture layers (a positive electrode mixture layer and a negative electrode mixture layer) on the surfaces of the current collectors.

In this manner, the positive electrode and the negative electrode are produced.

In the step of manufacturing the battery 10, the positive electrode and the negative electrode produced through the above-mentioned process are laminated and wound together with the separator, thus forming the electrode body. Then, the external terminals 50 and the current-collecting terminals 51 integrated with the lid part 32 of the exterior 30 are connected to the electrode body, and the electrode body is stored in the storage part 31 of the exterior 30. Thereafter, the storage part 31 and the lid part 32 of the exterior 30 are joined by welding to seal the exterior 30.

When the seal of the exterior 30 is finished, the pouring hole 33 is not sealed by the cap 40 or the film 120 (see the pouring hole 33 shown at the upper left in FIG. 2).

Therefore, at this time, the pouring hole 33 is open. In other words, the pouring hole 33 in the present embodiment serves as an opening which connects the inside and the outside of a battery case according to the present invention.

As shown in FIG. 2, after the exterior 30 is sealed, an electrolyte solution E is poured through the pouring hole 33 (see an arrow E in FIG. 2).

At this time, for example, the exterior 30 is stored in a chamber 110, and a predetermined pouring unit is set on the exterior 30, then producing a vacuum inside the chamber 110. Thereafter, the air is introduced into the chamber 110 to return the pressure inside the chamber 110 to the atmospheric pressure. In the step of manufacturing the battery 10, the electrolyte solution E is poured into the exterior 30 by utilizing the differential pressure produced at this time.

A means for pouring the electrolyte solution is not limited to the means in the present embodiment. For example, a pouring nozzle may be inserted into the pouring hole in an air atmosphere, and then the electrolyte solution may be forced toward the pouring nozzle to pour the electrolyte solution into the exterior.

After the electrolyte solution E is poured into the exterior 30, temporary sealing of the pouring hole 33 is performed (the pouring hole 33 is temporarily sealed).

At this time, the lower part of the pouring hole 33 is covered by placing the thin film 120 made of a resin onto the stepped part of the pouring hole 33, for example. Then, the film 120 is deposited to the lid part 32 by emitting a laser beam along the outer peripheral part of the film 120 using a laser welding machine (see the black-painted triangle in FIG. 2 and the film 120 in FIG. 4).

In this manner, in the step of manufacturing the battery 10, a step of temporarily sealing the pouring hole 33 with the film 120 is performed after pouring the electrolyte solution E.

In other words, the film 120 in the present embodiment serves as a temporary sealing member according to the present invention.

A means for temporarily sealing the pouring hole is not limited to the means in the present embodiment. For example, the film may be stuck to the stepped part of the pouring hole by applying an adhesive to the stepped part.

After the pouring hole 33 is temporarily sealed, an initial charge of the unfinished battery 10 (an initial charge of the power-generating element 20) is performed.

Figure 7:
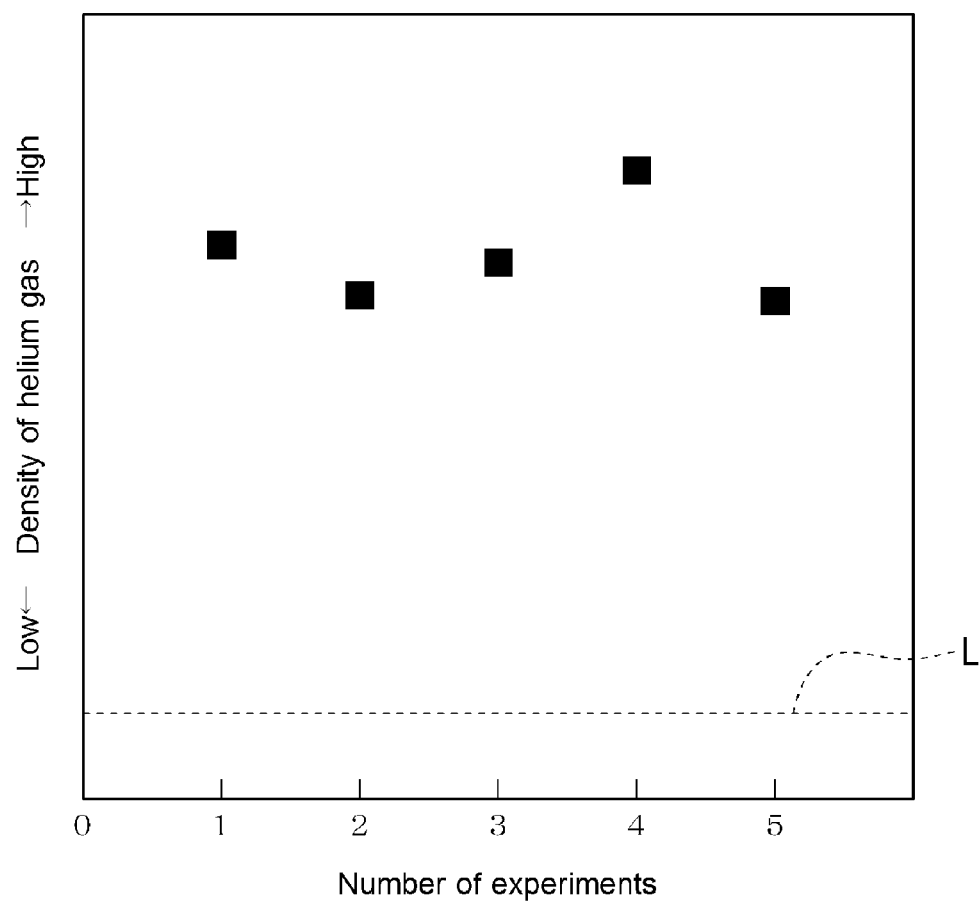
FIG. 7 shows measurement results of the density of the helium gas.

At this time, the exterior 30 is bound by a binding jig, and thereby a predetermined amount of load is applied to the exterior 30 in the thickness direction of the exterior 30 (in the rearward direction of FIG. 7). Then, electrodes of a power source device 130 are connected to the external terminals 50 so as to perform the initial charge of the battery 10 (the power-generating element 20).

During the binding and the initial charge, a gas HC (see FIG. 4) such as hydrocarbon is generated in the exterior 30 by, for example, decomposition of the electrolyte solution E poured into the exterior 30.

Therefore, during the binding and the initial charge, the gas HC accumulates in the temporarily sealed exterior 30, and thereby the internal pressure of the exterior 30 increases (see the white-painted arrows in FIG. 2).

Figure 3:
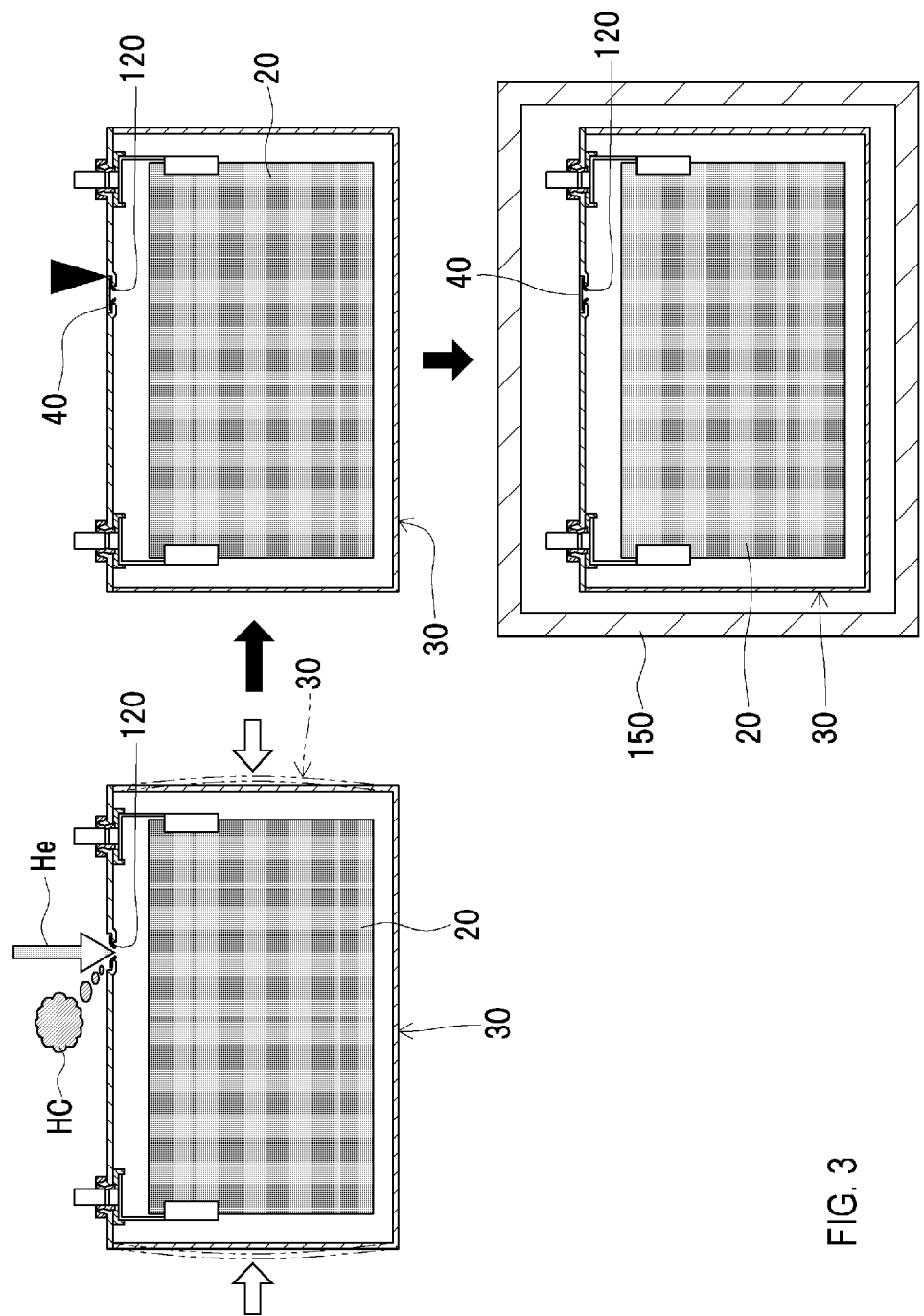
FIG. 3 shows steps from release of a gas generated during the initial charge to an inspection of sealability of a battery case.

For this reason, as shown in FIG. 3, the gas HC accumulating in the exterior 30 is released by piercing the film 120 from the outside to open the pouring hole 33. As a result, the internal pressure of the exterior 30 is reduced (see the white-painted arrows and the exterior 30 indicated by a two-dot chain line in FIG. 3).

The step of manufacturing the battery 10 includes a step of introducing a helium gas He into the exterior 30 through the open pouring hole 33 (see an arrow He in FIG. 3).

In the step of manufacturing the battery 10, the step of introducing the helium gas He includes releasing the gas HC generated during the initial charge.

The step of introducing the helium gas He is specifically described later.

After the helium gas He is introduced into the exterior 30, the pouring hole 33 is finally sealed with the cap 40.

At this time, the cap 40 is placed on the stepped part of the pouring hole 33, and then the pouring hole 33 is sealed by emitting a laser beam along the outer peripheral part of the cap 40 using the laser welding machine (see the black-painted triangle in FIG. 3).

The cap 40 in the present embodiment serves as a final sealing member according to the present invention.

After the pouring hole 33 is sealed, an inspection is performed as to whether the helium gas He introduced into the exterior 30 leaks or not (i.e., whether the exterior 30 has sealability or not).

At this time, the exterior 30 is stored in a chamber 150, and then a vacuum is produced inside the chamber 150. Thereafter, the amount of the helium gas He leaking from the exterior 30 per unit time is measured by a commercially available helium-leak inspection unit.

A determination is made, based on the output value of the helium-leak inspection unit, as to whether the exterior 30 has a leak.

Specifically, if the output value of the helium-leak inspection unit is smaller than an inspection threshold, it is determined that the helium gas He does not leak from the exterior 30. If the output value of the helium-leak inspection unit is the inspection threshold or more, it is determined that the helium gas He leaks from the exterior 30.

Thus, in the present embodiment, a detection gas for determining a leakage from the exterior 30 is the helium gas He.

The detection gas is not limited to the helium gas as in the present embodiment, but the helium gas is preferably used. This is because, compared with other detection gases, a use of the helium gas brings the following advantageous effects in the step of manufacturing the battery: adverse effect on battery performance can be prevented, and the leakage through a minute hole can be detected owing to small molecular diameter of helium.

Additionally, a mixture gas of the helium gas and a gas other than the helium gas may be introduced when the helium gas is introduced.

After the leakage of the helium gas He from the exterior 30 is inspected, an inspection of voltage is performed, and the exterior 30 is released from the binding jig.

In the step of manufacturing the battery 10, the sealed-type battery 10 is manufactured as mentioned above.

Then, the step of introducing the helium gas He is described.

Hereinafter, assume that in the exterior 30, the pouring hole 33 is temporarily sealed and the internal pressure is increased by the gas HC generated during the binding and the initial charge (see FIG. 4).

Figure 4:
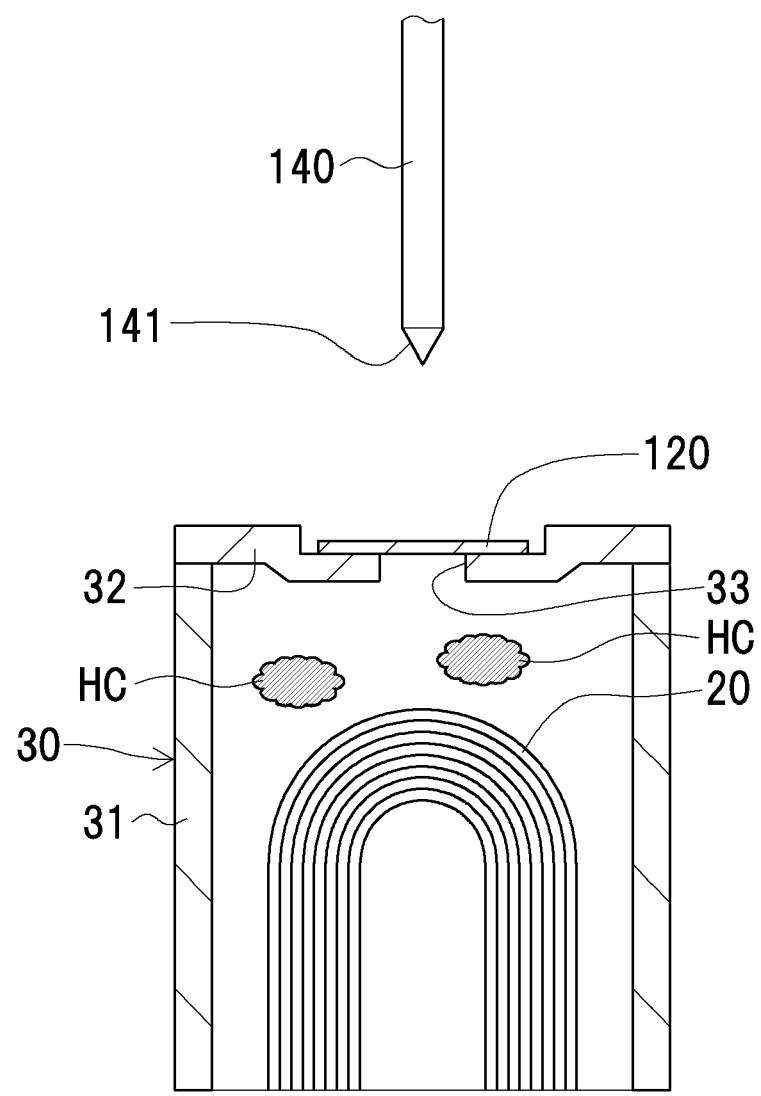
FIG. 4 shows a sealing nozzle.

The step of manufacturing the battery 10 includes the step of introducing the helium gas He using a sealing nozzle 140 as shown in FIG. 4.

As shown in FIG. 4, a tip part 141 (the lower part) of the sealing nozzle 140 is pointed downward so that the outer diameter of the tip part 141 gradually decreases toward the lower side (the tip part 141 is concentrated on the center of the sealing nozzle 140).

The sealing nozzle 140 has discharging ports connecting the inside and the outside of the sealing nozzle 140, the discharging ports being formed on the lateral surface of the sealing nozzle 140 above the tip part 141, namely, the lateral surface of the part having an equal outer diameter.

The sealing nozzle 140 is arranged above the pouring hole 33, and is connected to a predetermined helium-supply source through a pipe, a pump and the like. This configuration enables the sealing nozzle 140 to discharge the helium gas He.

The sealing nozzle 140 is configured to move up and down by a cylinder or the like connected thereto.

In the step of manufacturing the battery 10, using the above-mentioned sealing nozzle 140, the step of introducing the helium gas He is performed as follows.

Figure 5:
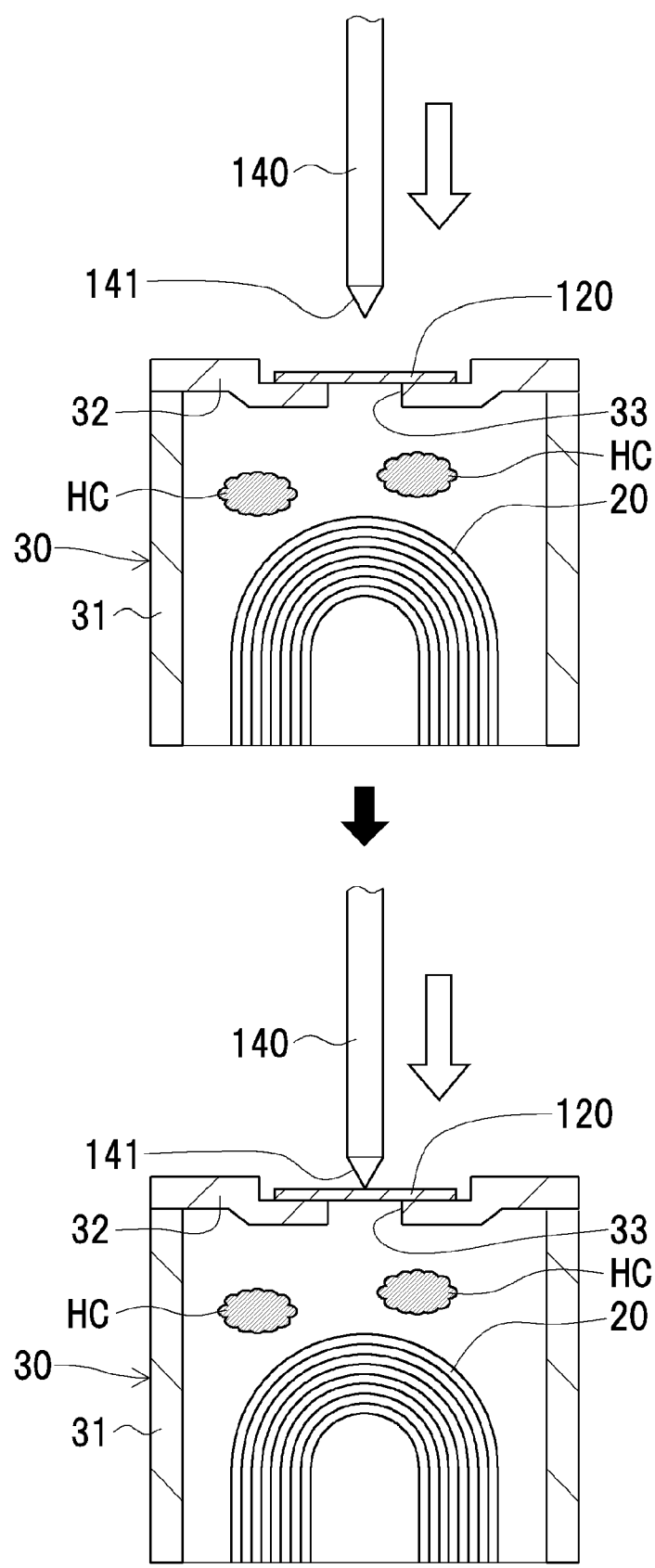
FIG. 5 shows a situation where the sealing nozzle is moved down.

First, as shown in FIG. 5, the sealing nozzle 140 is moved down so as to approach the exterior 30 (see the white-painted arrow on the upper side in FIG. 5).

At this time, the pouring hole 33 is still temporarily sealed with the film 120, namely, covered with the film 120.

Next, the tip part 141 of the sealing nozzle 140 is brought into contact with the film 120 by moving down the sealing nozzle 140.

Even after the contact therebetween, the sealing nozzle 140 is kept moving down (see the white-painted arrow on the lower side in FIG. 5).

As mentioned previously, the tip part 141 of the sealing nozzle 140 is pointed downward. Therefore, when moving down, the sealing nozzle 140 pierces the film 120.

In this manner, the temporary seal of the exterior 30 is removed.

Figure 6:
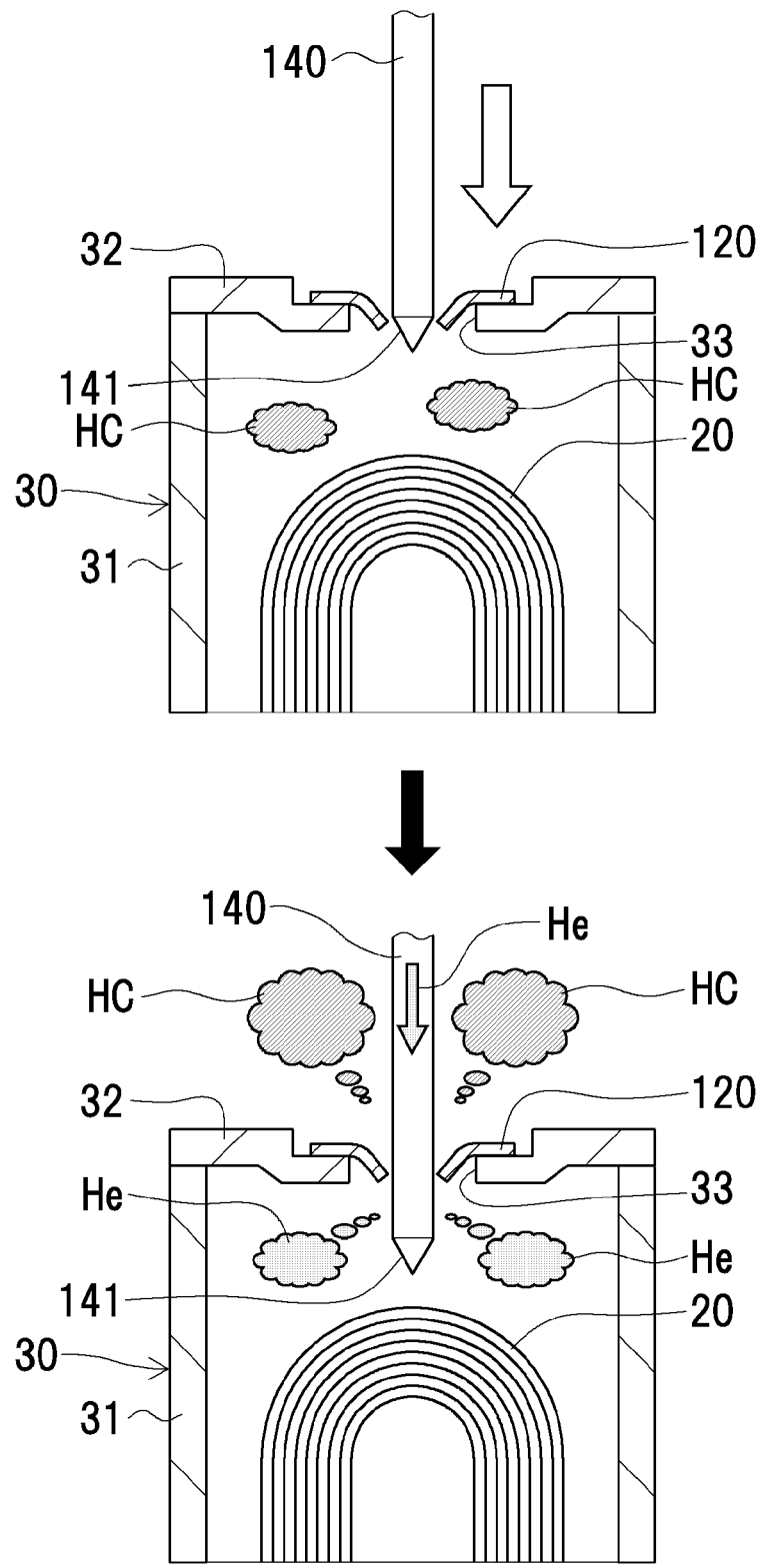
FIG. 6 shows how to introduce a helium gas.

Even after the temporary seal of the exterior 30 is removed, the sealing nozzle 140 is kept moving down (see the white-painted arrow in FIG. 6).

When the tip part 141 of the sealing nozzle 140 and the discharging ports are situated above the power-generating element 20 and below the film 120, the sealing nozzle 140 is stopped from moving down.

After the sealing nozzle 140 is stopped from moving down, the helium gas He is discharged from the discharging ports of the sealing nozzle 140 for a predetermined time to introduce the helium gas He into the exterior 30 (see an arrow He in FIG. 6).

From piercing the film 120 to introducing the helium gas He, the gas HC accumulating in the exterior 30 is discharged to the outside through the pouring hole 33 by a pressure difference between the inside and the outside of the exterior 30.

In the step of manufacturing the battery 10, as mentioned above, the gas HC generated during the initial charge is released, and at the same time, the helium gas He is introduced.

After the helium gas He is discharged from the sealing nozzle 140, the sealing nozzle 140 is moved up so as to return to the position at the level thereof before introducing the helium gas He.

In this manner, in the step of manufacturing the battery 10, in the downward movement of the sealing nozzle 140, namely, in the chain of acts for introducing the helium gas He, the temporary seal of the pouring hole 33 is removed and the helium gas He is introduced into the exterior 30.

In the case of temporarily sealing the pouring hole 33 in order to release the gas HC generated during the initial charge, the helium gas He cannot be introduced by a conventional technique unless the temporary seal is previously removed, but the helium gas He can be introduced in the step of manufacturing the battery 10 even if the temporary seal of the pouring hole 33 is not removed.

In other words, in the step of manufacturing the battery 10, the removal of the temporary seal of the pouring hole 33 and the introduction of the helium gas He can be performed in one step (at the same time).

This makes it possible to restrain the increase in the internal pressure of the exterior caused by the gas HC generated during the initial charge without releasing the gas HC accumulating in the exterior 30.

Therefore, it is possible to release the gas HC generated during the initial charge without increasing the number of steps, and consequently to reduce the cost required to manufacture the battery 10.

Thus, the step of manufacturing the battery 10 includes the step of introducing the helium gas He into the exterior 30 while opening the pouring hole 33 temporarily sealed with the film 120.

Figure 8:
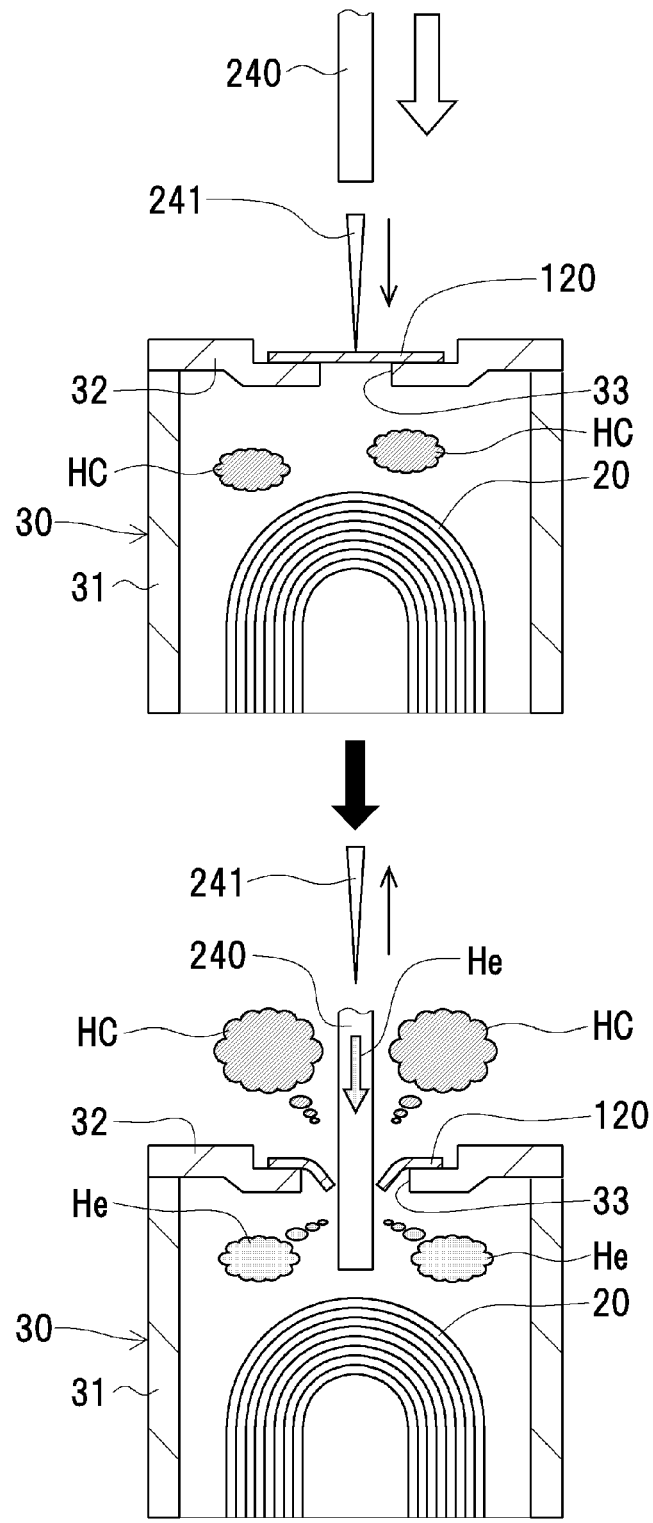
FIG. 8 shows how to release the gas generated during the initial charge and to introduce the helium gas, using a gas-releasing needle and the sealing nozzle which move separately from each other.

A means for introducing the helium gas He is not limited to the means in the present embodiment. For example, as shown in FIG. 8, the helium gas He may be introduced using a sealing nozzle 240 whose tip is flat and a gas-releasing needle 241 whose tip is pointed, which are configured to move up and down separately from each other.

In this case, for example, the gas-releasing needle 241 is moved down to pierce the film 120, and the sealing nozzle 240 is moved down to enter the exterior 30 through the pouring hole 33. After, the sealing nozzle 240 enters the exterior 30, the helium gas He is discharged from the sealing nozzle 240 and the gas-releasing needle 241 is moved up.

A result of the introduction of the helium gas He in the step of manufacturing the battery 10 is described below.

First, the film 120 was pierced by the sealing nozzle 140, and then the helium gas He was discharged from the sealing nozzle 140 to introduce the helium gas He (see FIG. 6).

Thereafter, the density of the helium gas He inside the exterior 30 into which the helium gas He had been introduced was measured with a helium-density measuring instrument.

The above-mentioned measurement of the density of the helium gas He was made a plurality of times.

As shown in FIG. 7, the density of the helium gas He inside the exterior 30 far exceeds the density of the helium gas He necessary for performing a leak inspection (the density of the helium gas He indicated by the dotted line in FIG. 7).

The above-mentioned result confirmed that, in the step of manufacturing the battery 10, a high density of helium gas He could be introduced so that the sealability of the exterior 30 might be reliably inspected even if the helium gas He was introduced while removing the temporary seal of the pouring hole 33.

As mentioned previously, in the step of manufacturing the battery 10, the film 120 is pierced by moving down the sealing nozzle 140 having the tip part 141 (i.e., the end part facing the exterior 30) which is downward pointed (see FIG. 6).

This makes it possible to remove the temporary seal of the pouring hole 33 in an act for introducing the helium gas He without independently performing an act only for removing the temporary seal of the pouring hole 33.

Therefore, it is possible not only to release the gas HC generated during the initial charge without increasing the number of steps but also to efficiently perform the release of the gas HC generated during the initial charge and the introduction of the helium gas He.

In other words, it is possible to reduce the time required to perform the release of the gas HC generated during the initial charge and the introduction of the helium gas He.

As mentioned above, in the step of introducing the helium gas He, the helium gas He is discharged from the sealing nozzle 140 while the tip part 141 of the sealing nozzle 140 pierces the film 120 by moving the sealing nozzle 140 toward the temporarily sealed pouring hole 33.

Figure 9:
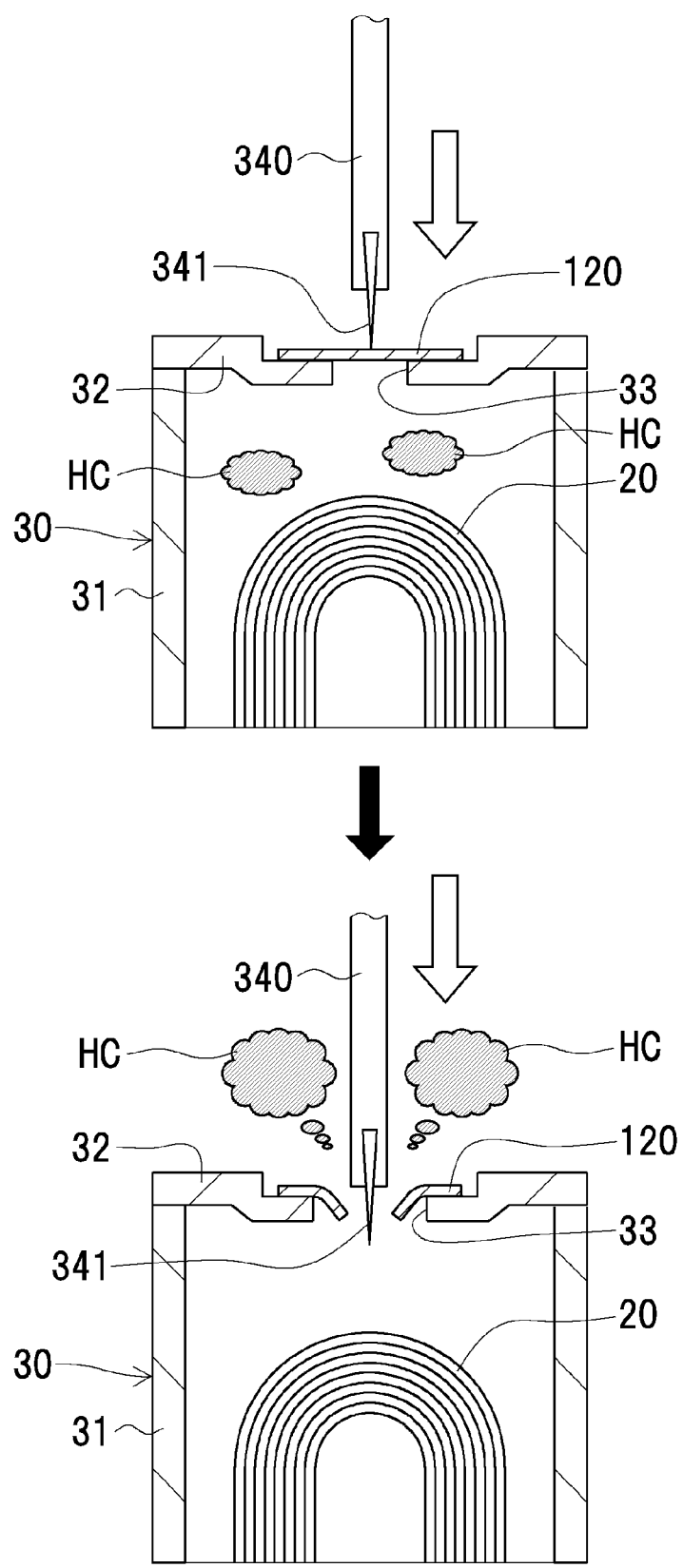
FIG. 9 shows a modified example of the sealing nozzle.

For example, as shown in FIG. 9, a sealing nozzle 340 to which a gas-releasing needle 341 protruding from the flat tip of the sealing nozzle 340 is attached may be used as long as the film can be pierced by moving down the sealing nozzle.

In this case, the tip of the gas-releasing needle 341 serves as an end of a sealing nozzle near an opening of a battery case according to the present invention.

A use of the sealing nozzle 140 having the pointed tip part 141 in the present embodiment enables further reduction of working cost for introducing the helium gas He, compared with the case of using the sealing nozzle 340 to which the gas-releasing needle 341 is attached as shown in FIG. 9.

In other words, a use of the sealing nozzle 140 having the pointed tip part 141 in the present embodiment enables further reduction of the cost required to manufacture the battery 10.

Figure 10:
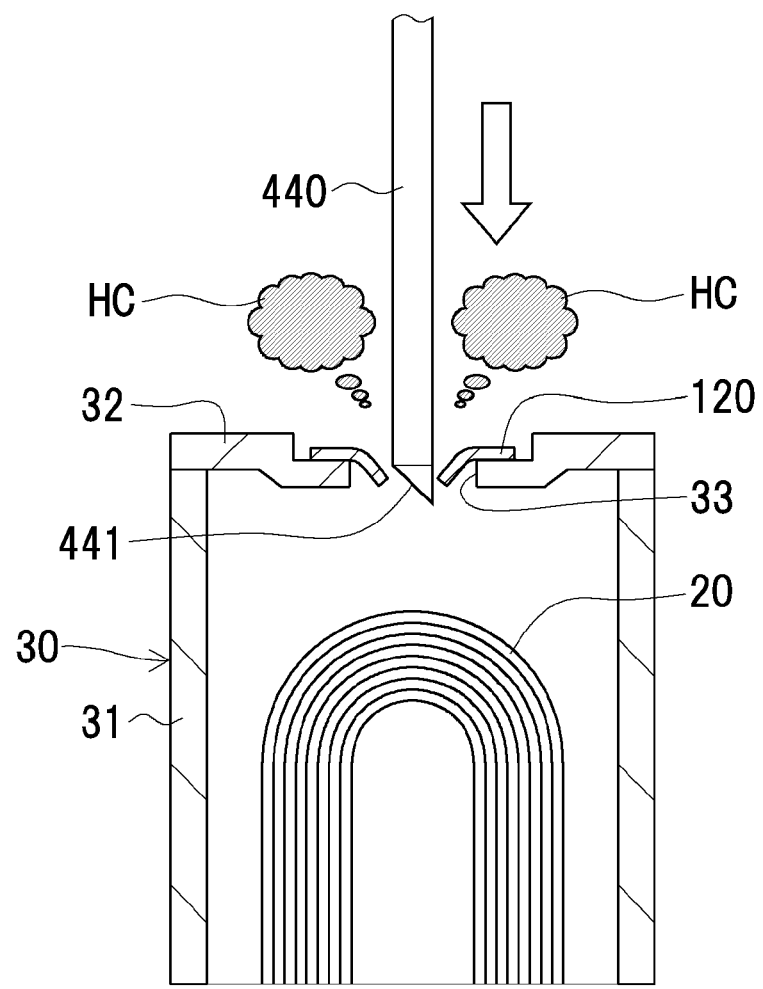
FIG. 10 shows a modified example of the tip part of the sealing nozzle.

The sealing nozzle having the pointed tip part is not limited to the sealing nozzle in the present embodiment. For example, the sealing nozzle having the pointed tip part may be, as show in FIG. 10, a sealing nozzle 440 having a tip part 441 whose one end in the radial direction is pointed downward so as to protrude relative to the other end in the radial direction, namely, the tip part 441 with a shape obtained by diagonally cutting a flat tip part.

The structure of the film is not limited to that in the present embodiment. For example, the film may be a metal sheet as long as the film can be broke by force from the outside in the step of introducing the helium gas He. Moreover, the film may be formed by laminating a plurality of sheets made of resin, metal or combination thereof.

INDUSTRIAL APPLICABILITY

The present invention is applicable to a method of manufacturing a sealed battery, the method including introducing a detection gas into a battery case through an opening after pouring an electrolyte solution into the battery case through the opening, and then sealing the opening.

REFERENCE SIGNS LIST

10: battery (sealed battery)
20: power-generating element
30: exterior (battery case)
33: pouring hole (opening)
40: cap (final sealing member)
120: film (temporary sealing member)
140: sealing nozzle
141: tip part
E: electrolyte solution
He: helium gas (detection gas)

The invention claimed is:

1. A method of manufacturing a sealed battery including a battery case having an opening which connects the inside and the outside of the battery case, and a power-generating element stored in the battery case, the method comprising:
   a step of storing an electrode body in the battery case, the electrode body having a positive electrode, a negative electrode and a separator;
   a step of pouring an electrolyte solution into the battery case through the opening to turn the electrode body into the power-generating element;
   a step of temporarily sealing the opening, with a film, of the battery case into which the electrolyte solution is poured;
   a step of performing an initial charge of the power-generating element inside the battery case in which the opening is temporarily sealed;
   a step of introducing a detection gas into the battery case through the opening while opening the opening temporarily sealed with the film; and
   a step of finally sealing the opening, with a final sealing member, of the battery case into which the detection gas is introduced,
   wherein the step of introducing the detection gas includes:
   preparing a sealing nozzle of which an outer diameter of a tip part gradually decreases toward the lower side, configured to discharge the detection gas; and
   discharging the detection gas from the sealing nozzle while an end of the sealing nozzle near the opening pierces the film by moving the sealing nozzle toward the temporarily sealed opening, and
   the step of temporarily sealing the opening includes that of depositing the film to the battery case by welding.

2. The method according claim 1, wherein after the step of finally sealing the opening, a step of performing an inspection to determine whether the detection gas is leaking into the battery case.

* * * * *